(12) United States Patent
Daniyala et al.

(10) Patent No.: US 11,882,334 B2
(45) Date of Patent: Jan. 23, 2024

(54) AUTOMATED USER-RESPONSIVE VIDEO CONTENT

(71) Applicant: DISH Network Technologies India Private Limited, Bengaluru (IN)

(72) Inventors: Prudvi Raj Daniyala, Munnekolala Marthahalli (IN); Sandeep Rachoori, Mahadevpura (IN)

(73) Assignee: DISH Network Technologies India Private Limited, Bengaluru (IN)

( * ) Notice: Subject to any disclaimer, the term of this patent is extended or adjusted under 35 U.S.C. 154(b) by 82 days.

(21) Appl. No.: 17/028,830

(22) Filed: Sep. 22, 2020

(65) Prior Publication Data

US 2022/0030316 A1    Jan. 27, 2022

(30) Foreign Application Priority Data

Jul. 24, 2020    (IN) .............................. 202041031734

(51) Int. Cl.
*H04N 21/466* (2011.01)
*H04N 21/472* (2011.01)
*H04N 21/44* (2011.01)

(52) U.S. Cl.
CPC . *H04N 21/47202* (2013.01); *H04N 21/44008* (2013.01); *H04N 21/4667* (2013.01); *H04N 21/47217* (2013.01)

(58) Field of Classification Search
None
See application file for complete search history.

(56) References Cited

U.S. PATENT DOCUMENTS

| | | | |
|---|---|---|---|
| 2005/0251273 A1* | 11/2005 | Bychowsky | H04H 60/13 381/56 |
| 2014/0282660 A1* | 9/2014 | Oztaskent | H04N 21/4725 725/38 |
| 2016/0099854 A1* | 4/2016 | Swaminathan | H04N 21/44213 709/224 |
| 2016/0134667 A1* | 5/2016 | Suresh | G06F 3/04842 715/753 |
| 2016/0261917 A1* | 9/2016 | Trollope | H04N 21/475 |
| 2019/0325079 A1* | 10/2019 | Blake | G06F 16/3334 |
| 2020/0068227 A1* | 2/2020 | Han | H04N 21/84 |
| 2020/0252680 A1* | 8/2020 | Panchaksharaiah | H04N 21/47205 |

\* cited by examiner

*Primary Examiner* — Jefferey F Harold
*Assistant Examiner* — Charles N Hicks
(74) *Attorney, Agent, or Firm* — Kilpatrick Townsend & Stockton LLP

(57) ABSTRACT

Techniques are described for delivery and handling of automated user-responsive video sub-content. For example, a user is consuming video content associated with content-of-interest (COI) identifiers corresponding to certain sub-content relevant to the video content during certain playback time windows. During playback, embodiments use one or more sensors detect dynamic user input. At some time during playback of the video content, some of the COI identifiers are considered to be actively relevant, and detected dynamic user input is determined to invoke at least one of the actively relevant COI identifiers. A COI query can automatically be generated based on the invoked one or more COI identifiers, and a corresponding query response can be automatically generated and output to the user based on response data associated with the invoked one or more COI identifiers.

19 Claims, 6 Drawing Sheets

AUTOMATED USER-RESPONSIVE VIDEO CONTENT

CROSS-REFERENCE TO RELATED APPLICATIONS

This application claims priority to Indian Provisional Application No. 202041031734, filed on Jul. 24, 2020, entitled "Automated User-Responsive Video Sub-Content," the disclosure of which is hereby incorporated by reference in its entirety for all purposes.

FIELD

This invention relates generally to media interactivity, and, more particularly, to delivery and handling of automated user-responsive video sub-content.

BACKGROUND

Individuals have more access to different types of media now than ever before. Stored and streaming video content can be accessed by users around the world on a variety of mobile playback devices, such as smart phones and tablet computers. Further, increased access to high-speed networks, availability of network-connected sensors and smart devices, and other technologies continue to provide consumers with new types of interactivity relating to media content. For example, media content consumers can easily search for streaming content via Internet-connected devices, navigate playback of content via graphical user interfaces, share certain types of content via social media applications, and receive suggestions for new content that may be of interest to them.

However, certain types of media still tends to be consumed passively, as those types of media offer little to no interactivity. One example is pre-recorded video content, such as television shows, movies, previously recorded online classes, etc. A consumer may use a remote control or other interaction device to search for such content, to navigate through such content (e.g., by pausing, rewinding, fast-forwarding, etc.), or the like. Similarly, the consumer may use an interactive device during consumption to chat with friends about the video content, or to search for relevant information about the video content. However, there tends to be little or no way for the consumer to interact directly with the recorded content.

SUMMARY

Among other things, embodiments provide novel systems and methods for delivery and handling of automated user-responsive video sub-content. For example, a user is consuming video content associated with content-of-interest (COI) identifiers corresponding to certain sub-content relevant to the video content during certain playback time windows. During playback, embodiments use one or more sensors detect dynamic user input. At some time during playback of the video content, some of the COI identifiers are considered to be actively relevant, and detected dynamic user input is determined to invoke at least one of the actively relevant COI identifiers. A COI query can automatically be generated based on the invoked COI identifier(s), and a corresponding query response can be automatically generated and output to the user based on response data associated with the invoked COI identifier(s).

According to one set of embodiments, a method is provided for automated user-responsive video content delivery. The method includes: outputting video content to a user via a playback device, the video content temporally associated with content-of-interest (COI) identifiers, such that each COI identifier is defined as actively relevant during a respective playback time window of the video content, each COI identifier further associated with respective response data; detecting receipt of dynamic input from the user at a detection time by monitoring a sensor system during the outputting; identifying a set of presently active COI identifiers as those of the COI identifiers defined as actively relevant during respective playback time windows that intersect with the detection time; analyzing the dynamic input according to the set of presently active COI identifiers automatically to generate a COI query corresponding to at least one of the set of presently active COI identifiers; generating a query response automatically responsive to the COI query based on the respective response data of the at least one of the set of presently active COI identifiers; and outputting the query response to the user via the playback device as responsive to the detecting.

According to another set of embodiments, a content delivery appliance is provided. The appliance includes: a network interface configured to receive video content from a content network, the video content temporally associated with content-of-interest (COI) identifiers, such that each COI identifier is defined as actively relevant during a respective playback time window of the video content, each COI identifier further associated with respective response data; a playback subsystem including a playback interface configured to couple with a playback device, the playback subsystem to output the video content to a user via the playback device; a sensor interface configured to couple with one or more sensors and to monitor the one or more sensors during outputting of the video content by the playback subsystem; an automated responder subsystem coupled with the sensor interface to detect receipt of dynamic input from the user via the one or more sensors at a detection time, the automated responder subsystem configured to: identify a set of presently active COI identifiers as those of the COI identifiers defined as actively relevant during respective playback time windows that intersect with the detection time; analyze the dynamic input according to the set of presently active COI identifiers automatically to generate a COI query corresponding to at least one of the set of presently active COI identifiers; generate a query response automatically responsive to the COI query based on the respective response data of the at least one of the set of presently active COI identifiers; and direct the playback subsystem to output the query response to the user via the playback device as a response to the detecting.

According to another set of embodiments, a system is provided for automated user-responsive video content delivery. The system includes a set of processors, and a processor-readable medium having instructions stored thereon, which, when executed, cause the set of processors to perform steps. The steps include: outputting video content to a user via a playback device, the video content temporally associated with content-of-interest (COI) identifiers, such that each COI identifier is defined as actively relevant during a respective playback time window of the video content, each COI identifier further associated with respective response data; detecting receipt of dynamic input from the user at a detection time by monitoring a sensor system during the outputting; identifying a set of presently active COI identifiers as those of the COI identifiers defined as actively relevant during respective playback time windows that intersect with the detection time; analyzing the dynamic input according to the set of presently active COI identifiers automatically to generate a COI query corresponding to at least one of the set of presently active COI identifiers; generating a query response automatically responsive to the COI query based on the respective response data of the at least one of the set of presently active COI identifiers; and outputting the query response to the user via the playback device as responsive to the detecting.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second label (e.g., a lower-case letter) that distinguishes among the similar components. If only the first reference label is used in the specification, the description is applicable to any one of the similar components having the same first reference label irrespective of the second reference label.

DETAILED DESCRIPTION

Embodiments of the disclosed technology will become clearer when reviewed in connection with the description of the figures herein below. In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Figure 1A:
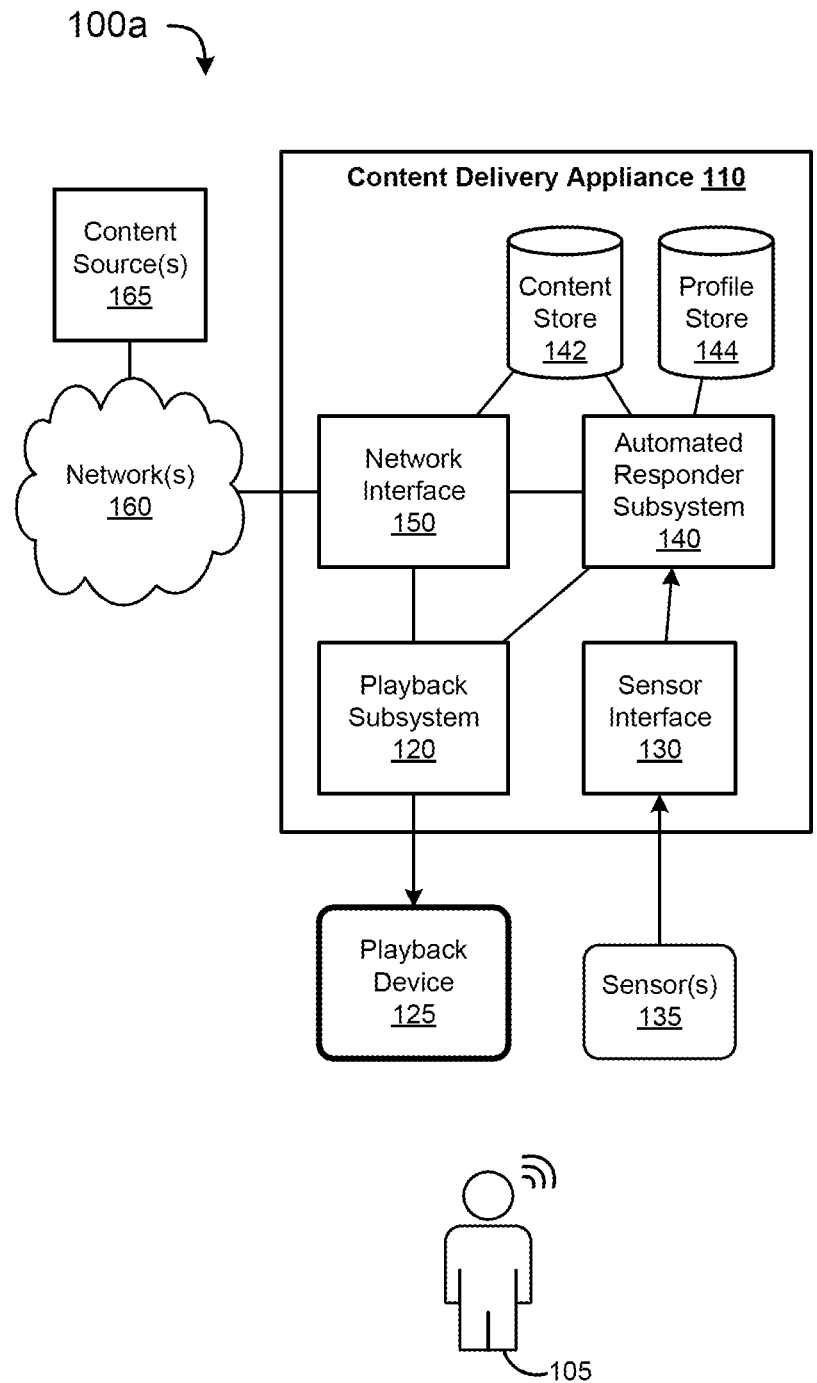
FIGS. 1A-1C show various architectures of content consumption environments, according to various embodiments.

Turning first to FIG. 1A, a content consumption environment 100a is shown, according to various embodiments. As illustrated, content consumption environment 100a includes a content delivery appliance 110. Embodiments of the content delivery appliance 110 can include a playback subsystem 120, a sensor interface 130, an automated responder subsystem 140, a network interface 150. Embodiments can also include one or more storage components, such as a content store 142 and/or a profile store 144. The particular arrangement of components is intended only to be illustrative. For example, features described with reference to one component can be performed by any suitable component and/or shared between multiple components, individually shown components can be grouped into fewer components or split into additional components, and components shown as part of the single content delivery appliance 110 can be distributed across multiple physically separate appliances or systems.

The playback subsystem 120 is shown coupled with a playback device 125. The playback device 125 can include any suitable device for playback of audiovisual media content, such as a television, computer monitor, smartphone display, etc. The playback subsystem 120 can include any suitable components to support playback via the playback device 125. For example, the playback device 125 can include one or more television tuners, components to implement one or more network protocols, logical and/or physical ports for communicating with the playback device 125, etc. In some implementations, the content delivery appliance 110 is separate from, and in communication with the playback device 125. For example, the content delivery appliance 110 can be implemented as a television receiver, set-top box, Internet router, desktop computer, or the like; and the playback device 125 can be a separate television or monitor display communicatively coupled with the content delivery appliance 110 via one or more wired and/or wireless communication links (e.g., a dedicated cable, a wireless fidelity (WiFi) link, etc.). In other implementations, the content delivery appliance 110 can include the playback device 125 as an integrated component. For example, the content delivery appliance 110 can be implemented as a tablet computer, laptop computer, smart phone, etc.; and the playback device 125 can be implemented as an integrated display.

The sensor interface 130 is shown coupled with one or more sensors 135. The sensor(s) 135 can include any suitable sensors to enable detection of dynamic input from a media consumer, as described herein. For example, the sensor(s) 135 can include one or more microphones, still cameras, video cameras, etc. The sensor interface 130 can include any suitable components to enable communicative coupling of the sensor(s) 135 with components of the content delivery appliance 110. In some implementations, the sensor interface 130 also includes components for processing received sensor data, such as one or more amplifiers, filters, etc. In some implementations, the content delivery appliance 110 is separate from, and in communication with the sensors 135. For example, the content delivery appliance 110 can be implemented as a television receiver, set-top box, Internet router, desktop computer, or the like; and the sensors 135 can include one or more microphones, cameras, and/or other peripheral sensor devices communicatively coupled with the content delivery appliance 110 via one or more wired and/or wireless communication links. In other implementations, the content delivery appliance 110 includes some or all of the sensors 135 as integrated components. For example, the content delivery appliance 110 can be implemented as a tablet computer, laptop computer, smart phone, etc.; and the sensors 135 can be implemented as microphones, cameras, and/or other sensors integrated into the content delivery appliance 110.

Embodiments of the network interface 150 facilitate communications between the content delivery appliance 110 and one or more content sources 165 via one or more networks 160. The content sources 165 can include any suitable sources of pre-recorded video content, such as one or more content distribution networks, content servers, cloud storage environments, broadcast media providers, etc. The networks 160 can include any suitable communication networks, such as any type of wired or wireless network, or combination thereof. Merely by way of example, the networks 160 may include a cable network, a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the networks 160 may include one or more network access points, such as wired or wireless network access points (e.g., base stations and/or internet exchange points). The network interface 150 can include any suitable components to facilitate communications with any suitable type of communication networks. For example, the network interface 150 can include one or more physical or logical communication ports, antennas, filters, amplifiers, tuners, protocol support, buffers, etc.

A user 105 is shown consuming media content via a playback device 125 coupled with the content delivery appliance 110. Consumers continue to have access to ever-increasing amounts and types of media via ever-increasing numbers and types of interfaces for consuming and interacting with media. Many of these types of media provide different levels of interactivity. For example, media consumers can conventionally use many types of interfaces to interact with other consumers and/or with the content itself in contexts, such as video games, social media, videoconferencing, live online classes, etc. However, other types of media continue primarily to be consumed in a passive manner. For example, pre-recorded video content, such as television shows, movies, previously recorded online classes, etc. tend to offer little to no interactivity with the content itself. Indeed, many interface technologies allow consumers of such pre-recorded video content to navigate through such content (e.g., by pausing, rewinding, fast-forwarding, etc.); or separate interaction environments can allow a consumer to chat with friends about the video content, comment on the content, or search for relevant information about the video content. However, conventionally, there tends to be little or no way for the consumer to interact directly with the pre-recorded content in its own interaction environment as the content is being consumed (e.g., via a single-screen experience).

Embodiments described herein enable such interaction with pre-recorded video content. In particular, embodiments are described herein as enabling user interaction with "sub-content" of such pre-recorded video content. For example, throughout a television program or movie, different scenes can include multiple types and instances of sub-content, such as particular geographical locations and/or scenery, particular actors, particular soundtrack content, particular historical or cultural references, particular allusions to other media, etc. It can be assumed that a consumer of the media may consider at least some of the sub-content as "content of interest" (COI), such that at least a portion of the sub-content of any pre-recorded video content can be defined as COI for purposes herein. Each instance of COI can be identified by a COI identifier, and can be relevant for a particular playback time window (e.g., a particular actor, scenery, or other sub-content is only shown at particular times in the playback of the content, such as only during a particular scene).

As described herein, during playback of such pre-recorded video content via the playback device 125, embodiments of the content delivery appliance 110 effectively "listen" via the sensors 135 for dynamic input from a consumer of the content, such as a verbal exclamation. The detected dynamic input can be analyzed against those of the COIs that are actively relevant at the time of the detection to determine whether the dynamic input can be used to generate a COI query relating to the actively relevant COIs. Such a COI query can automatically be generated, a response to the query also can automatically be generated, and the response can be output to the consumer via the playback device 125.

Embodiments of the automated responder subsystem are coupled with the sensor interface 130 to detect receipt of dynamic input from the user 105 via the one or more sensors 135 in furtherance of features described herein. According to some embodiments, the network interface 150 is configured to receive video content (pre-recorded video content) from a content network 160. The video content is temporally associated with COI identifiers, such that each COI identifier is defined as actively relevant during a respective playback time window of the video content. Each COI identifier is also associated with respective response data, as described below. The playback subsystem 120 incudes a playback interface to couple with the playback device playback device 125, such that the playback subsystem 120 can output the video content to the user 105 via the playback device 125. During playback of the pre-recorded video content, the sensor interface 130 is coupled with the one or more sensors 135 to monitor for dynamic input from the user. In some implementations, the sensor(s) 135 are configured to monitor for dynamic input as audio input from the user 105, such as a vocal exclamation, a sudden rise or fall in volume, a verbal prompt, etc. In some implementations, the sensor(s) 135 are configured to monitor for dynamic input as video input from the user 105, such as a change in facial expression, a particular gesture or bodily movement, etc. In some implementations, the sensor(s) 135 are configured to monitor for dynamic input as other input from the user, such as a typed statement.

It can be assumed that at some point in time during playback of the pre-recorded video content, the dynamic input is received by the sensor interface 130 from the user 105 via the one or more sensors 135. The point in time can be considered as a "detection time." Embodiments of the automated responder subsystem 140 can identify a set of presently active COI identifiers as those of the COI identifiers defined as actively relevant during respective playback time windows that intersect with the detection time. For example, at any particular time during playback, certain sub-content of the pre-recorded video content (e.g., particular actors, particular scenery, particular music, etc.) may likely be of interest to the user 105, as presently being part of the playback, or recently having been part of the playback; and that sub-content can correspond to a particular subset of COI identifiers that can be considered as the set of presently active COI identifiers for that particular detection time. The automated responder subsystem 140 can analyze the dynamic input according to the set of presently active COI identifiers automatically to generate a COI query corresponding to at least one of the set of presently active COI identifiers. The automated responder subsystem 140 can then generate a query response automatically responsive to the COI query based on the respective response data of the at least one of the set of presently active COI identifiers, and the automated responder subsystem 140 can direct the playback subsystem 120 to output the query response to the user via the playback device 125. For example, the query response can be output as an audible response and/or a visible response presented to the user via the playback device 125.

Figure 1B:
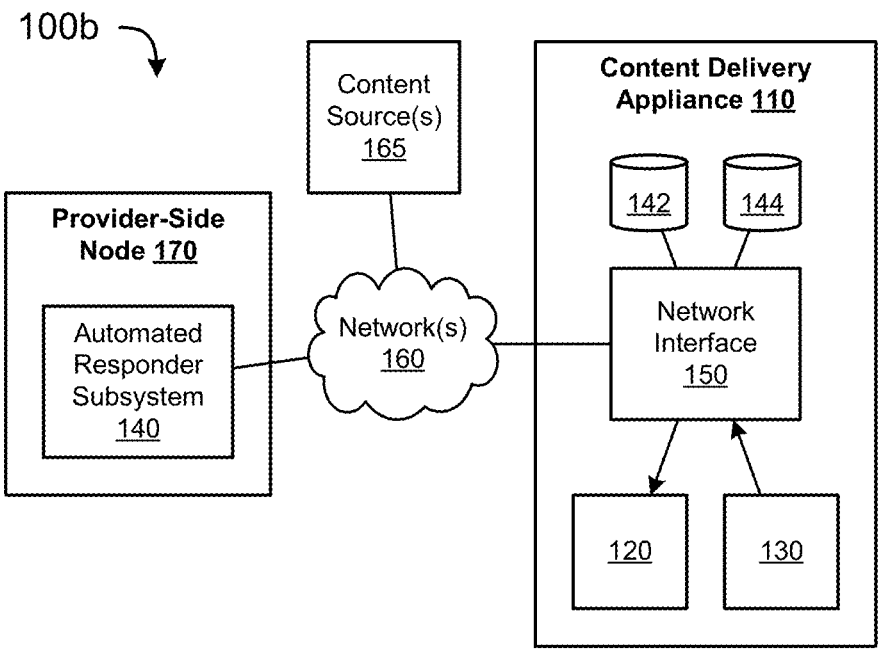
Figure 1C:
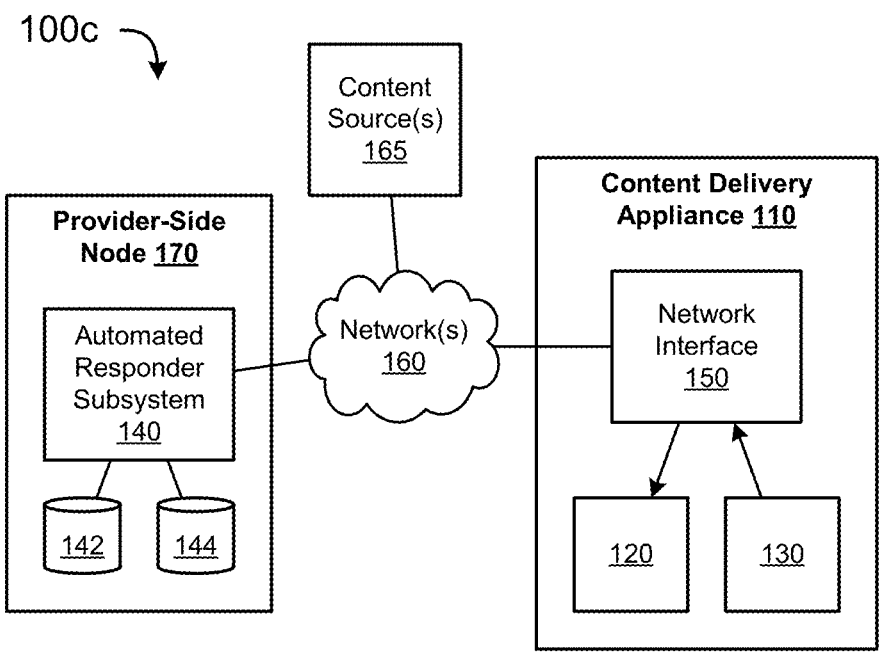

The configuration shown in FIG. 1A represents only one type of implementation of a content consumption environment 100a for providing automated response features described herein. FIGS. 1B and 1C show alternate content consumption environments 100. As illustrated in FIG. 1B, content consumption environment 100b includes a content delivery appliance 110 similar to the content delivery appliance 110 of FIG. 1A, except that the content delivery appliance 110 does not include the automated responder subsystem 140. As illustrated, the content delivery appliance 110 includes a playback subsystem 120, a sensor interface 130, a network interface 150, a content store 142, and a profile store 144. The automated responder subsystem 140 is disposed in a provider-side node 170 in communication with the content delivery appliance 110 via the one or more networks 160. For example, the content delivery appliance 110 is disposed in a user's premises (e.g., in a relatively fixed location, such as a television receiver, cable television appliance, home Internet router, etc.); and the provider-side node 170 is located in a remote network location, such as within a physical provider location and/or a cloud server. Alternatively, the content delivery appliance 110 is implemented by a mobile user device, and the provider-side node 170 is located in relatively fixed location, such as a physical provider location or the user's premises in a provider-supplied appliance.

Similar to FIG. 1B, FIG. 1C shows a content consumption environment 100c having a content delivery appliance 110 in communication with a provider-side node 170 via the one or more networks 160. As in FIG. 1B, the content delivery appliance 110 in FIG. 1C includes the playback subsystem 120, sensor interface 130, and network interface 150; and the provider-side node 170 includes the automated responder subsystem 140. Unlike FIG. 1B, the content consumption environment 100c of FIG. 1C shows the content store 142 and profile store 144 as also implemented in the provider-side node 170. For example, one or both of the content store 142 and the profile store 144 can be implemented using physical storage media of a server computer at a physical provider node, implemented in a cloud storage environment, etc. While FIGS. 1B and 1C provide alternative architectures for the content consumption environment 100, embodiments can be implemented using any suitable distribution of components and any corresponding architectures.

Figure 2:
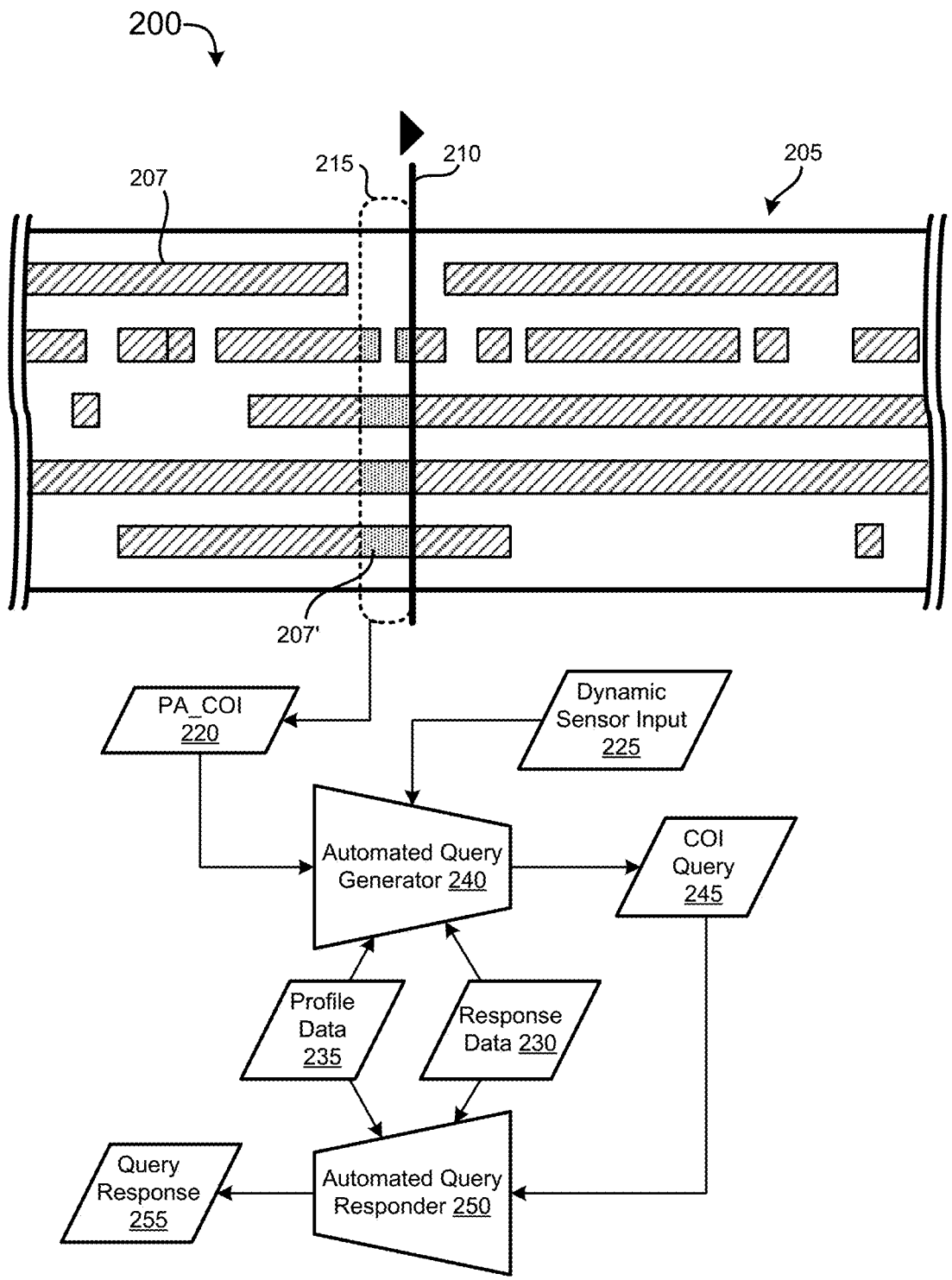
FIG. 2 shows an illustrative flow diagram in context of an example playback segment of video content, according to various embodiments.

FIG. 2 shows an illustrative flow diagram 200 in context of an example playback segment of video content 205, according to various embodiments. The example playback segment shows a diagrammatic representation of a playback range within the video content 205 extending some amount of time before and after a present playback location 210 (indicated by a thick vertical line). Within the playback segment of the video content 205 are a number of COI identifiers 207. The COI identifiers 207 can be associated with the video content 205 in any suitable way. In some implementations, some or all COI identifiers 207 are embedded within the content data of the video content 205. For example, metadata can be used to store some or all of the COI identifiers 207. In other implementations, some or all COI identifiers 207 are stored in a separate file (e.g., in the content store 142 of FIG. 1A) that is associated with the video content 205. In one such implementation, metadata of the video content 205 points to the separate file of COI identifiers 207. In another such implementation, the file of COI identifiers 207 is stored with a content identifier that identifies its associated video content 205 file or files.

As illustrated, each COI identifier 207 is associated with a temporal location and duration during which the COI identifier 207 is considered to be actively relevant. The temporal information can be stored with the COI identifier 207 in any suitable manner. The temporal information can indicate one or more timestamps, beginning and ending times (e.g., implying a duration) for widows during which the COI identifier 207 is actively relevant, beginning times with associated durations (e.g., implying an ending time), etc. In some cases, a potentially interesting item of sub-content only arises a single time in the video content 205 (e.g., an actor who makes a cameo appearance in a single scene of a movie, or a particular geographical location that is shown only once in a movie). In other cases, a same potentially interesting item of sub-content appears over multiple playback time windows in the video content 205. For example, a particular actor may be in multiple scenes of a television program, a particular restaurant may be featured in multiple scenes of a television program, etc. In some implementations, where a particular item of sub-content is considered actively relevant in multiple playback time windows, each playback time window for that item of sub-content is associated with a respective unique COI identifier 207 (i.e., each COI identifier 207 is uniquely associated with a single playback time window for a particular item of sub-content). In other implementations, where a particular item of sub-content is considered actively relevant in multiple playback time windows, each item of sub-content is associated with a respective unique COI identifier 207, and the COI identifier 207 is associated with data identifying each of the playback time windows during which that item of sub-content is actively relevant.

The COI identifiers 207 can relate to any sub-content temporally associated with playback of the video content 205 and having potential interest to a consumer of the video content 205. In some implementations, some or all COI identifiers 207 relate to what is being (or was recently) output as part of playback of the video content 205, such as actors seen or heard during a scene, locations depicted in the scene, music or sounds playing during the scene, items displayed in the foreground or background of the scene, etc. In other implementations, some or all COI identifiers 207 relate to information relating to what is being depicted during playback of the video content 205. For example, a COI identifier 207 may indicate that a current scene includes beautiful scenery, a cityscape, a battle scene, etc.; the current scene includes an award-winning supporting actor; the scene is representative of the filming or storytelling style of a particular director; etc. The COI identifiers 207 can be associated with different levels of generality or specificity in different implementations. As one example, some or all COI identifiers 207 in some implementations can correspond to specific sub-content, such as corresponding to depiction of a particular stage within a particular coffee shop in a particular geographic location; or depiction of a particular grouping of actors in a shared scene engaged in a particular activity. As another example, some or all COI identifiers 207 in some implementations can correspond to general sub-content, such as corresponding to depiction generally of a geographic scene of potential interest, depiction generally of a certain type of activity, or depiction generally of a strong female lead.

Some features described herein are based on identification of a set of presently active COI identifiers 220 in relation to any present playback location 210 in the video content 205. The set of presently active COI identifiers 220 is illustrated as including a subset of the COI identifiers 207 (denoted as COI identifiers 207'). Such an identification can involve determining which of the COI identifiers 207 are actively relevant in a relevance window 215 corresponding to the present playback location 210. In some implementations, the relevance window 215 includes only the present playback location 210 and does not span forward or backward from the present playback location 210 (e.g., it effectively has zero time duration). In other implementations, the relevance window 215 has an ending time pinned to the present playback location 210 and a starting time some amount of time prior to the present playback location 210. In some such implementations, the starting time is a fixed amount of time prior to the present playback location 210. In other such implementations, the starting time is a dynamic amount of time prior to the present playback location 210, determined based on various factors. For example, the amount of time may be based on a number of bits, and that number may dynamically adjust to dynamic changes in bitrate; or the amount of time may dynamically change passed on the pace and/or intensity of activity depicted in the video content 205. Other implementations of the relevance window 215 can include a relevance window 215 that extends past the present playback location 210.

In some implementations, the starting time, ending time, and/or duration of the relevance window 215 is the same for all COI identifiers 207. In other implementations, the starting time, ending time, and/or duration of the relevance window 215 is different for different ones of the COI identifiers 207. For example, the relevance window 215 provides for a certain content stickiness, resulting in a lag between the sub-content no longer being displayed and the sub-content no longer being of interest (e.g., the consumer may still express interest relating to the sub-content even after the content is no longer being displayed). In some such implementations, different amounts of stickiness may be associated with different COI identifiers 207, such that the starting time of the relevance window 215 may differ for different ones of the COI identifiers 207. As one example, in a case where an object important to a plot line quickly and unexpectedly appears in the scene and disappears shortly after, a COI identifier 207 associated with that object may be determined to have a high level of stickiness and may be associated with a relatively long relevance window 215. As another example, in a case where a first location is shown consistently over an extended duration before the action ultimately moves to a second location, a COI identifier 207 associated with the first location may be determined to have a low level of stickiness and may be associated with a relatively short relevance window 215.

Embodiments can apply any suitable filter operation, sort operation, logical operation, or other data processing technique to the temporal information of the COI identifiers 207 to determine which respective playback time windows of the COI identifiers 207 overlaps (e.g., intersects) with the present playback location 210. In some embodiments, all COI identifiers 207 having playback windows of active relevance that coincide with the present relevance window 215 (or relevance windows 215) are identified as part of the set of presently active COI identifiers 220 for the present playback location 210. In some embodiments, the set of presently active COI identifiers 220 is continuously maintained and dynamically updated in a memory (e.g., content store 142). In other embodiments, the set of presently active COI identifiers 220 is generated responsive to a trigger occurrence, such as receipt of dynamic sensor input 225.

As noted with reference to FIG. 1A, it can be assumed that at some point in time during playback of the video content 205, dynamic sensor input 225 is received (i.e., by the sensor interface 130 from the user 105 via the one or more sensors 135). In some embodiments, the sensors 135 are continually monitoring and receiving sensor input, such that dynamic sensor input 225 is only considered "received" when analysis of the continually monitored sensor input indicates that the input should be treated as dynamic sensor input 225. For example, embodiments can listen for a trigger word, crossing of a volume threshold, a particular movement or gesture, etc. to signal that subsequent sensor input should be considered as dynamic sensor input 225. A "detection time" can be defined according to the point in time at which the dynamic sensor input 225 is considered as received. The detection time can then be associated with the present playback location 210 for implementing subsequent features. For example, responsive to determining that dynamic sensor input 225 is received, the relevance window 215 (or relevance windows 215) associated with the present playback location 210 corresponding to the detection time is used to identify the set of presently active COI identifiers 220 for use in COI query generation and other features.

Some embodiments determine whether the dynamic sensor input 225 has been received at least partially according to a dynamically updated set of presently active COI identifiers 220. In some such embodiments, the set of presently active COI identifiers 220 is used to maintain a dynamically updated set of presently active candidate COI keywords. In some implementations, the set of presently active candidate COI keywords includes terms associated with (e.g., previously stored in association with) the set of presently active COI identifiers 220. For example, the set of presently active candidate COI keywords can include an actor or place name corresponding to an actor or place associated with one of the set of presently active COI identifiers 220. In other implementations, a set of predefined keywords includes more general terms, such as "location," "actor," etc.; and the set of presently active candidate COI keywords effectively points to, or otherwise identifies, those of the set of predefined keywords that relate to the set of presently active COI identifiers 220 as the set of presently active candidate COI keywords. In some implementations, the set of presently active candidate COI keywords includes both COI-specific keywords, and more generalized keywords. Embodiments can parse sensor input to determine whether at least one user trigger word is detected as relating to at least one of the set of candidate COI keywords. For example, received sensor input may be provisionally considered as dynamic sensor input 225 until a determination is made as to whether any relevant user trigger words can be parsed from the dynamic sensor input 225 that invoke (e.g., match, are synonymous with, are indicative of, are linguistically related to, are semantically related to, etc.) one or more of the set of candidate COI keywords. Such parsing can involve any suitable audio and/or video signal processing, natural language processing, machine learning, gesture recognition, facial expression analysis, and/or any other suitable techniques for parsing potential user trigger words from the dynamic sensor input 225. The provisionally considered dynamic sensor input 225 can be considered as received dynamic sensor input 225 when relevant terms are detected, and a detection time can be associated, accordingly. In some implementations, determining that relevant terminology is found in the dynamic sensor input 225 involves determining that parsed terms directly invoke one or more of the set of candidate COI keywords. In other implementations, determining that relevant terminology is found in the dynamic sensor input 225 involves identifying any terms determined to indicate a potential interest or query by the user, and seeking to find any of the set of presently active COI identifiers 220 or any of the set of candidate COI keywords as potentially relevant or related to the potential interest or query.

As illustrated, embodiments can include an automated query generator 240, which may be implemented as part of the automated responder subsystem 140. Embodiments of the automated query generator 240 can generate a relevant COI query 245 in accordance with the dynamic sensor input 225 and the set of presently active COI identifiers 220. In some implementations, the terms parsed from the dynamic sensor input 225 are used to identify a particular one or more of the set of presently active COI identifiers 220 as invoked for query generation. As used herein, such references to parsed "terms," or the like, are intended generally to refer to any type of derived chunk of discrete semantic meaning usable by automated approaches described herein to provide analysis and query-related features. For example, computerized parsing of the dynamic sensor input 225 can yield potentially meaningful events, such as recognized spoken words, gestures, facial expressions, commands, typed text, and/or other events, each associated by the computer with a particular discrete meaning; all of which may be considered as parsed "terms" herein.

By analyzing the parsed terms from the dynamic sensor input 225 against the set of presently active COI identifiers 220 (e.g., the set of candidate COI keywords, or the like), the automated query generator 240 can determine an appropriate query that is likely to provide supplemental content of interest to the user 105. In some embodiments, different types of COI identifiers 207 are categorically associated with particular types of queries. For example, parsing of a term indicating "where" is likely to invoke a subset of COI identifiers 207 relating to depicted locations, while parsing of a term indicating "who" is likely to invoke a subset of COI identifiers 207 relating to depicted actors. In other embodiments, natural language processing is used to identify a most likely desired type of query, and the set of presently active COI identifiers 220 is used to determine a most likely invoked COI identifier 207. For example, a user exclaiming, "didn't I just see her in something else?" may be interpreted by the automated query generator 240 to indicate a query about other roles starring the actress corresponding to one of the set of presently active COI identifiers 220 (e.g., and possibly an extension of the query to filter on content recently consumed by the same user). In other embodiments, parsing is used to detect terms complying with one or more command structures, which can more explicitly invoke particular query types and/or particular COI identifiers 207. For example, a user may state, "query: list of movies starring actress," or the like.

In some embodiments, the automated query generator 240 first determines whether a relevant COI query 245 is generable (e.g., can be generated) at all. In some cases, the parsed terms may have no relation to any of the set of presently active COI identifiers 220. For example, the dynamic sensor input 225 may indicate that the user 105 is talking about (or even asking about) a geographical location, but none of the set of presently active COI identifiers 220 relates to a geographical location (or non relates to the particular geographical location being discussed). In some such embodiments, the automated query generator 240 ignores the dynamic sensor input 225 and continues to listen for other dynamic sensor input 225 that may result in generating a relevant COI query 245. In other such embodiments, the COI query 245 directs output of an indication that the query generation was unsuccessful. For example, the automated responder subsystem 140 directs the playback subsystem 120 to output to the playback device 125 an audible and/or visual indication of an unsuccessful query.

In some embodiments, the automated query generator 240 generates the COI query 245 further according to response data 230 and/or profile data 235 (e.g., stored in the profile store 144). COI identifiers 207 can be associated with response data 230. In some implementations, some or all response data 230 is stored as part of, or in association with, the COI identifiers 207, such as in the content store 142. In other implementations, a portion of the response data 230 is obtainable by remote access to one or more data sources (e.g., a content source 165, the Internet, etc. via the network(s) 160). The response data 230 for a COI identifier 207 can include any suitable information relating to a potential query, or response to a potential query, associated with the COI identifier 207. In some implementations, the response data 230 includes facts relating to the specific subject of the COI identifier 207. For example, a COI identifier 207 associated with scenery can be associated with location-related response data 230, such as indicating its name, geographical location, weather, population, politics, economy, culture, etc.; while a COI identifier 207 associated with an actor can be associated with actor-related response data 230, such as the actor's name, other roles, awards, common co-stars, age, gender, family, etc. In some implementations, the response data 230 indicates categorical information about the COI identifier 207. For example, the response data 230 may indicate that a COI identifier 207 relates to scenery, actor, genre, scene type (e.g., action battle scene, suspenseful scene, etc.), artistic imagery, etc. Profile data 235 can include any suitable information relating to the user 105 and/or one or more user subscriptions, user premises, user family members, etc. For example, the profile data 235 can relate to the user's name, age, gender, viewing habits, purchase habits, political affiliations, hobbies, family, marital status, socioeconomics, subscription levels, geographical location, etc.

Embodiments of the automated query generator 240 can use the response data 230 and/or the profile data 235 to aid in automatic query generation in any suitable manner. In some implementations, the automated query generator 240 uses the response data 230 to help automatically determine which types of queries are relevant to the set of presently active COI identifiers 220. In some implementations, the automated query generator 240 uses the profile data 235 to help automatically determine which types of queries are likely relevant to the user 105. In some cases, an analysis of the dynamic sensor input 225 and the set of presently active COI identifiers 220 yields multiple potentially relevant COI queries 245, and the available response data 230 and/or profile data 235 can be used by the automated query generator 240 to select one of the multiple potentially relevant COI queries 245 as likely most relevant. Such relevance can be based, for example, on the COI query 245 likely to yield a most relevant response given the available response data 230, on the COI query 245 most likely to be of interest to the user 105 given the user profile data 235, etc.

Some embodiments indicate availability of automated response features to the user 105. Some such indications may signal to the user 105 that the particular video content 205 being consumed is configured for, compatible with, or otherwise usable with automated response features. In some embodiments, automated response features may be selectively enabled or disabled, and some such indications may signal to the user 105 whether the automated response features are presently enabled. In some embodiments, such indications can help remind the user 105 of the availability of such features and/or can help inform the user as to the types of COI identifiers 207 that may presently be invoked by query (e.g., the set of presently active COI identifiers 220). In some such embodiments, one or more icons, or any other suitable indication, can be indicated on the playback device 125, for example, overlaid on the playback of the video content 205, or in a dedicated region of the display. In one implementation, a single indication generally indicates to the user 105 that something currently being depicted is available for use with automated response features. For example, an icon pops up in the corner of the display screen when an actress enters the scene, and the user 105 may infer that asking about, or declaring about, the actress may yield results. In another implementation, one or more indications represent categories of COI identifiers 207, such as "person," "place," "thing," etc. For example, when if the "person" and "place" icon are both showing up in the corner of the display screen, the user 105 may understand that an automated response may be provided responsive to any questions or statements about actors or locations presently being depicted. In other implementations, more specific indications may be provided, for example, pointing to, or highlighting, a particular element being displayed at the present playback location 210.

As illustrated, embodiments include an automated query responder 250 to automatically generate a query response 255 to the COI query 245 generated by the automated query generator 240. Embodiments of the automated query responder 250 are implemented by the automated responder subsystem 140. The automated query responder 250 can generate the query response 255 based on the respective response data 230 of whichever one or more of the set of presently active COI identifiers 220 was invoked to generate the COI query 245. As one example, the generated COI query 245 asks for the name of the actor being depicted at the present playback location 210, corresponding response data 230 is retrieved from storage associated with the corresponding COI identifier 207 that includes the actor's name, and the automated query responder 250 generates the query response 255 to provide the actor's name. As another example, the generated COI query 245 asks for other popular movies starring the actor being depicted at the present playback location 210, the automated query responder 250 determines that previously stored response data 230 cannot be used to generate a relevant response and automatically initiates an Internet search, and the automated query responder 250 generates the query response 255 to provide relevant results based on the Internet search results.

In some embodiments, the automated query responder 250 generates the query response 255 further according to profile data 235. In some such embodiments, multiple valid query responses 255 could be generated in response to the same COI query 245, and the automated query responder 250 uses the profile data 235 to help evaluate which query response 255 is likely the most relevant to the user. In other such embodiments, the profile data 235 is used to provide supplemental information to supplement the query and/or the results. As one example, the generated COI query 245 asks for identification of a geographic location being depicted at the present playback location 210, corresponding response data 230 indicates the name and geographic coordinates of the depicted location, profile data 235 indicates the user's geographical coordinates, and automated query responder 250 generates the query response 255 based on querying a mapping application to determine a relative distance and travel time between the user's location and the depicted location. In some embodiments, response data 230 can include one or more COI context hooks that provide for the insertion of dynamic data, for example relating to profile data 235, to supplement response data 230. For example, the response data 230 may include one or more fields (e.g., "user name") to allow the response to dynamically and automatically generated as "I know, [user name], that really is an amazing location!" In some implementations, some or all COI context hooks can relate to contextual information unrelated to the profile data 235. For example, the COI context hooks can relate to present time (e.g., of day, of year, etc.), a detected location of the content delivery appliance 110 and/or playback device 125, a hardware status (e.g., remaining battery life, network connectivity, current bit rate, etc.), and/or any other suitable information.

As described herein, having generated the query response 255 by the automated query responder 250, the automated responder subsystem 140 can direct output of the response via the playback subsystem 120. The query response 255 can be output to the user in any suitable manner. For example, the query response 255 can be output as a text and/or video pop-up, or other overlay on the video content 205 via the playback device 125; as text and/or video in a region of the display other than where the video content 205 is being shown via the playback device 125; as a voice response (e.g., a computer-generated spoken response) via the playback device 125; as an audio and/or video output to a separate device (e.g., a smart phone or other "third-screen" device, etc.); etc. In some embodiments, output of the video content 205 is paused during output of the query response 255. In other embodiments, output of the video content 205 continues during output of the query response 255.

For added clarity, various illustrative examples are provided. The examples are intended to highlight and clarify certain features, and are not intended to limit the scope of embodiments described herein. As a first illustration, the user 105 is consuming a movie via a television (playback device 125). Various playback time widows in the movie are associated with COI identifiers 207 relevant during those playback time windows. In a particular scene of the movie, two actors look out over a beautiful vista. Accordingly, the pre-recorded video content 205 for the movie is associated with set of presently active COI identifiers 220 during that scene including COI identifiers 207 relating to each of the two actors, and a COI identifier 207 relating to the geographical location of the vista. During playback of that scene, the sensor(s) 135 detects the user exclaiming, "it looks amazing there!" The automated responder subsystem 140 automatically generates a COI query 245 based on parsing the user's exclamation in context of the set of presently active COI identifiers 220, such that the COI query 245 indicates an apparent desire by the user to know more about the depicted vista. The automated responder subsystem 140 uses response data 230 associated with an invoked one of the set of presently active COI identifiers 220 to automatically generate and output a query response 255. One example output of the query response 255 includes an overlay on the television that reads: "Yes, it is beautiful there!" Another example output of the query response 255 is generated to include profile data 235, and reads: "Yes, Mary, it is beautiful there!" Another example output of the query response 255 is generated to include response data 230, and reads: "Yes, it is beautiful there! This scene was filmed near the top of Peak Mountain in National Park, a popular camping and hiking destination." Another example output of the query response 255 is generated to include response data 230 with COI context hooks and/or profile data 235, and reads: "Yes, it is beautiful there, particularly at this time of year. This scene depicts Peak Mountain in National Park, which is only about a 7.5-hour drive from here. The weather this Sunday looks perfect for a visit!"

As a second illustration, the user 105 is watching a previously recorded online class, which has been configured, so that various playback time widows in the class are associated with COI identifiers 207 relevant during those playback time windows. At a particular point during the class, the lecturer finishes an example and begins to move on to another subject; and the user exclaims: "Ugh! I still don't get it!" In response to detecting the exclamation as dynamic sensor input 225 from the user, the automated responder subsystem 140 automatically generates a COI query 245 to indicate an apparent desire by the user to know more about the subject with which the user is struggling; and, in the process, identifies one of the set of presently active COI identifiers 220 as relating to examples for the subject. The automated responder subsystem 140 uses response data 230 associated with the identified COI identifier 220 to automatically generate and output a query response 255 that includes a pre-recorded supplemental video showing an additional example relating to the same subject. According to one example output, playback of the original video content 205 is automatically paused, while the recorded video of the additional example plays (e.g., replacing the playback of the original video content 205, in a pop-up window, etc.); and playback of the original video content 205 automatically resumes after completion of playback of the supplemental content. Other outputs can include additional features. As one alternate example, a prompt is provided to the user asking whether the supplemental video content should be played prior to playing the video of the additional example. For example, the response output can read: "Don't be too hard on yourself—this is difficult stuff! Would you like the lecturer to run through another example?" The system can then wait for any suitable type of input (e.g., audio input) to indicate whether or not to play the supplemental content. Similarly, upon completion of playback of the supplemental content, an example output can prompt the user whether to proceed with playback of the original video content 205, to play another video of another additional example, etc.

As a third example, the user 105 is watching a pre-recorded cooking program, which has been configured, so that various playback time widows in the class are associated with COI identifiers 207 relevant during those playback time windows. At a particular point during the program, the user is detected as asking: "What kind of wood is she using to smoke that fish?"; to which a relevant COI query 245 is generated based on detecting the question as dynamic sensor input 225 and analyzing against the set of presently active COI identifiers 220. Accordingly, a query response is generated, such that the on-screen chef responds with, "I always prefer hickory wood planks with this type of fish, but some people really enjoy the flavor of cedar." For example, pre-recorded audio and/or video data, deep learning technologies, and/or other techniques are used to provide a real instance, or generate a synthetic instance, of the on-screen chef responding to the user's question, even though the program is pre-recorded.

As a fourth example, the user 105 is watching an action movie, which has been configured, so that various playback time widows in the class are associated with COI identifiers 207 relevant during those playback time windows. During a particularly action-packed segment of the movie, the user begins to have a loud discussion with someone else in the room. Based on the detected dynamic sensor input 225 and the set of presently active COI identifiers 220, a COI query 245 is automatically generated to seek a relevant response to the dynamic change in volume during the scene. Based at least on response data 230 previously associated with an invoked one of the set of presently active COI identifiers 220, a query response 255 is automatically generated to output a response, such that the on-screen action stops, and the response states: "Hey, this type of fighting is not as easy as it looks! Could you please keep it down over there?" As one example output, the response is vocalized by a generic computer-generated voice. As another example output, the response is a pre-recorded audio and/or video response of one of the actors in the scene. As another example output, the response uses deep learning technologies, and/or other techniques, to generate a synthetic audio and/or video response of one of the actors in the scene.

Figure 3:
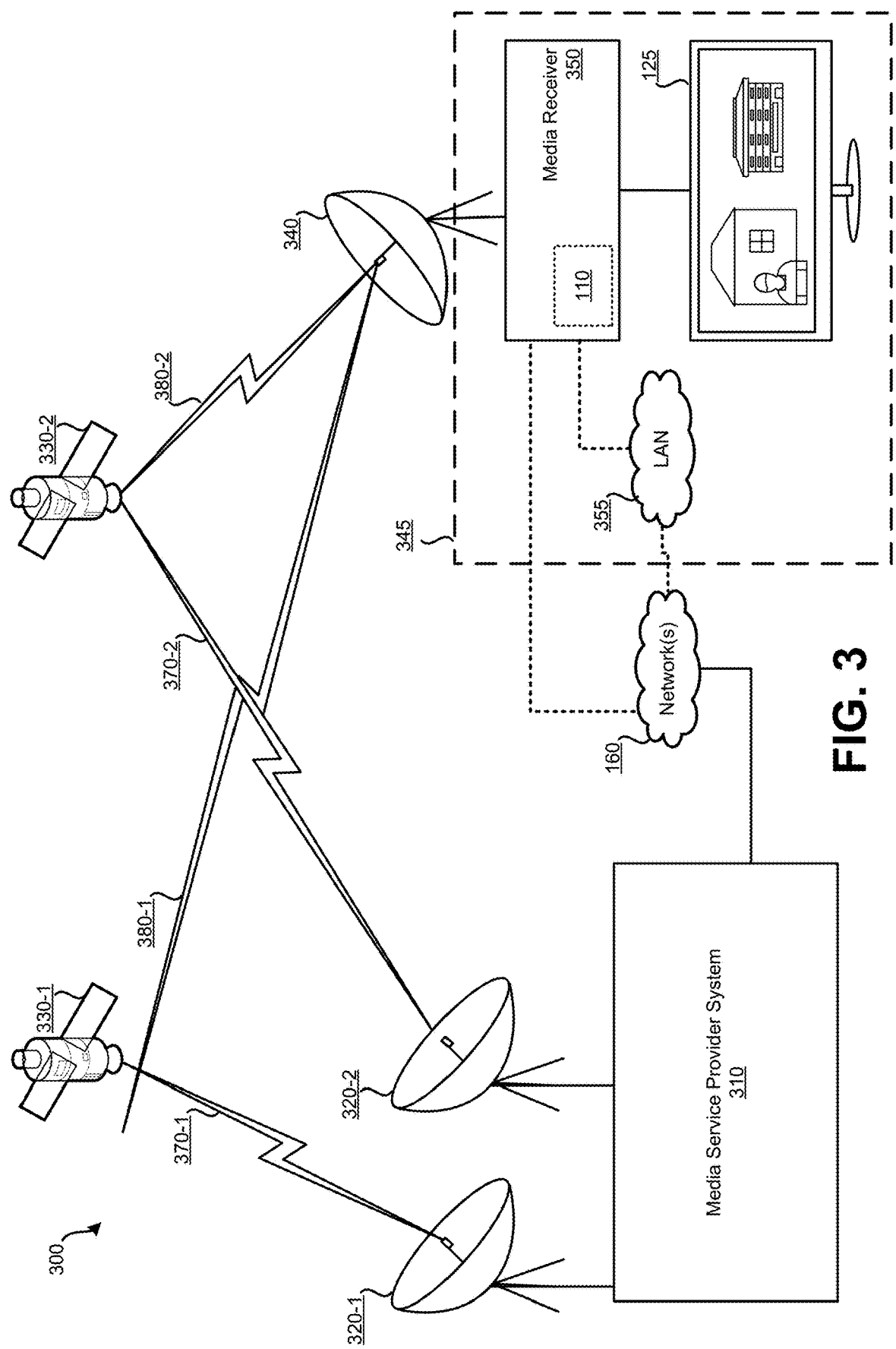
FIG. 3 shows an illustrative satellite television distribution system as an example context for various embodiments described herein.

The automated response features described above with reference to FIGS. 1A-1C and 2 can be implemented in context of any suitable communications system. FIG. 3 shows an illustrative satellite television distribution system 300 as an example context for various embodiments described herein. Satellite television distribution system 300 may include: television service provider system 310, satellite transmitter equipment 320, satellites 330, satellite dish 340, media receiver 350, and display device 125. The illustrated embodiment assumes that the content delivery appliance 110 is implemented by the media receiver 350, such as illustrating an implementation of the content consumption environment 100a described with reference to FIG. 1A. As noted above, other implementations can use different architectures, for example, implementing certain features in the media receiver 350 and other features in the television service provider system 310 or other suitable location. Further, alternate embodiments of satellite television distribution system 300 may include fewer or greater numbers of components. While only one satellite dish 340, media receiver 110, and display device 160 (collectively referred to as "user equipment") are illustrated, it should be understood that multiple (e.g., tens, thousands, millions) instances of user equipment may receive television signals from television service provider system 310 via satellites 330. Further, while embodiments are described in particular context of a satellite television distribution system 300, techniques described herein can also be implemented in context of other television and media distribution architectures and infrastructures, such as cable television distribution networks.

The user equipment is shown disposed at a subscriber premises 345. The subscriber premises 345 can be a subscriber's home, office, or any suitable location associated with a particular subscriber at which to locate the subscriber's satellite dish 340 and media receiver 350. As one example, the satellite dish 340 is mounted to an exterior location (e.g., wall, roof, etc.) of the subscriber's home, and cables run from the satellite dish 340 to the media receiver 350, which is located inside the subscriber's home; and one or more display devices 125 (e.g., televisions) is coupled with the media receiver 350 and located in the subscriber's home.

Other user equipment can be in the subscriber's premises 345 that may or may not be directly associated with the television service provider. As illustrated, the user equipment can include a LAN router 355 in communication with the network 160. The LAN router 355 can be implemented as any suitable device or set of devices that creates a local network from the network 160 connection. For example, the LAN router 355 can include any suitable routers, switches, modems, wireless transceivers, wired ports, etc. Though described as a "LAN," the LAN router 355 can create any suitable type of network, such as a wide-area network (WAN), a home-area network (HAN), a wireless local-area network (WLAN), etc. The LAN router 355 can be in communication with the media receiver 350 using a wired or wireless communications link. This can enable certain functions described herein, such as automatic discovery of presently unpaired devices.

The LAN router 355 can also provide local connectivity with one or more additional subscriber devices. Some such subscriber devices can be portable subscriber devices that may or may not remain in the subscriber's premises 345, such as the illustrated smart phone or laptop computer. As described herein, certain of those portable subscriber devices may be configurable as remote media playback devices using specialized coordination applications. For example, a subscriber may desire to use one or more of the portable subscriber devices to playback one or more of: live television programming received via the media receiver 350 (e.g., linearly broadcast television programming), on-demand television programming receivable via the media receiver 350, on-demand television programming locally cached by the media receiver 350, other recorded media locally cached by the media receiver 350, subscription media available via the Internet or other content distribution channels, etc.

Television service provider system 310 and satellite transmitter equipment 320 may be operated by a television service provider. A television service provider may distribute television channels, on-demand programming, programming information, and/or other content/services to users. Television service provider system 310 may receive feeds of one or more television channels from various sources. Such television channels may include multiple television channels that contain at least some of the same content (e.g., network affiliates). To distribute television channels for presentation to users, feeds of the television channels may be relayed to user equipment via multiple television distribution satellites 330. Each satellite 330 may relay multiple transponder streams. Satellite transmitter equipment 320 (320-1, 320-2) may be used to transmit a feed of one or more television channels from television service provider system 310 to one or more satellites 330. While a single television service provider system 310 and satellite transmitter equipment 320 are illustrated as part of satellite television distribution system 300, it should be understood that multiple instances of transmitter equipment may be used, possibly scattered geographically, to communicate with satellites 330. Such multiple instances of satellite transmitting equipment 320 may communicate with the same or with different satellites 330. Different television channels may be transmitted to satellites 330 from different instances of transmitting equipment 320. For instance, a different satellite dish of satellite transmitter equipment 320 may be used for communication with satellites 330 in different orbital slots.

Satellites 330 may be configured to receive signals, such as streams of television channels, from one or more satellite uplinks such as satellite transmitter equipment 320. Satellites 330 may relay received signals from satellite transmitter equipment 320 (and/or other satellite transmitter equipment) to multiple instances of user equipment via transponder streams. Different frequencies may be used for uplink signals 370 from transponder streams 380. Satellites 330 may be in geosynchronous orbit. Each of the transponder streams transmitted by satellites 330 may contain multiple television channels transmitted as packetized data. For example, a single transponder stream may be a serial digital packet stream containing multiple television channels. Therefore, packets for multiple television channels may be interspersed.

Multiple satellites 330 may be used to relay television channels from television service provider system 310 to satellite dish 340. Different television channels may be carried using different satellites 330. Different television channels may also be carried using different transponders of the same satellite 330; thus, such television channels may be transmitted at different frequencies and/or different frequency ranges. As an example, a first and second television channel may be relayed via a first transponder of satellite 330-1. A third, fourth, and fifth television channel may be relayed via a different satellite or a different transponder of the same satellite relaying a transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment. Each transponder stream may be able to carry a finite amount of data. As such, the number of television channels that can be included in a particular transponder stream may be at least partially dependent on the resolution of the video of the television channel. For example, a transponder stream may be able to carry seven or eight television channels at a high resolution, but may be able to carry dozens, fifty, a hundred, two hundred, or some other number of television channels at reduced resolutions.

Satellite dish 340 may be a piece of user equipment that is used to receive transponder streams from one or more satellites, such as satellites 330. Satellite dish 340 may be provided to a subscriber for use on a subscription basis to receive television channels provided by the television service provider system 310, satellite transmitter equipment 320, and/or satellites 330. Satellite dish 340, which may include one or more low noise blocks (LNBs), may be configured to receive transponder streams from multiple satellites and/or multiple transponders of the same satellite. Satellite dish 340 may be configured to receive television channels via transponder streams on multiple frequencies. Based on the characteristics of media receiver 350 and/or satellite dish 340, it may only be possible to capture transponder streams from a limited number of transponders concurrently. For example, a tuner of media receiver 350 may only be able to tune to a single transponder stream from a transponder of a single satellite at a given time. The tuner can then be re-tuned to another transponder of the same or a different satellite. A media receiver 350 having multiple tuners may allow for multiple transponder streams to be received at the same time.

In communication with satellite dish 340 may be one or more media receivers. Media receivers may be configured to decode signals received from satellites 330 via satellite dish 340 for output and presentation via a display device, such as display device 125. A media receiver may be incorporated as part of a television or may be part of a separate device, commonly referred to as a set-top box (STB). Media receiver 350 may decode signals received via satellite dish 340 and provide an output to display device 125. A media receiver 350 is defined to include set-top boxes (STBs) and also circuitry having similar functionality that may be incorporated with another device. For instance, circuitry similar to that of a media receiver 350 may be incorporated as part of a television, and/or such circuitry can be implemented in multiple appliances. While FIG. 3 illustrates an embodiment of media receiver 350 as separate from display device 125, it should be understood that, in other embodiments, similar functions may be performed by a media receiver integrated with display device 125.

Display device 125 may be used to present video and/or audio decoded and output by media receiver 350. Media receiver 350 may also output a display of one or more interfaces to display device 125, such as a recommendation interface and/or an electronic programming guide (EPG). In many embodiments, display device 125 is a television. Display device 125 may also be a monitor, computer, or some other device configured to display video and, possibly, play audio.

Uplink signal 370-1 represents a signal between satellite transmitter equipment 320 and satellite 330-1. Uplink signal 370-2 represents a signal between satellite transmitter equipment 320 and satellite 330-2. Each of uplink signals 370 may contain streams of one or more different television channels. For example, uplink signal 370-1 may contain a first group of television channels, while uplink signal 370-2 contains a second group of television channels. Each of these television channels may be scrambled such that unauthorized persons are prevented from accessing the television channels.

Transponder stream 380-1 represents a transponder stream signal between satellite 330-1 and satellite dish 340. Transponder stream 380-2 represents a transponder stream signal between satellite 330-2 and satellite dish 340. Each of transponder streams 380 may contain one or more different television channels, which may be at least partially scrambled. For example, transponder stream 380-1 may be a first transponder stream containing a first group of television channels, while transponder stream 380-2 may be a second transponder stream containing a different group of television channels. When a television channel is received as part of a transponder stream and is decoded and output to display device 125 (rather than first storing the television channel to a storage medium as part of DVR functionality then later outputting the television channel from the storage medium), the television channel may be considered to be viewed "live."

FIG. 3 illustrates transponder stream 380-1 and transponder stream 380-2 being received by satellite dish 340 and distributed to media receiver 350. For a first group of television channels, satellite dish 340 may receive transponder stream 380-1 and for a second group of channels, transponder stream 380-2 may be received. Media receiver 350 may decode the received transponder streams. As such, depending on which television channels are desired to be presented or stored, various transponder streams from various satellites may be received, descrambled, and decoded by media receiver 350.

Network 160 may serve as a secondary communication channel between television service provider system 310 and media receiver 350. However, in many instances, media receiver 350 may be disconnected from network 160 (for reasons such as because media receiver 350 is not configured to connect to network 160 or a subscriber does not desire or cannot connect to network 160). As such, the connection between network 160 and media receiver 350 is represented by a dotted line. Via such a secondary communication channel, bidirectional exchange of data may occur. As such, data may be transmitted to television service provider system 310 from media receiver 350 via network 160. Data may also be transmitted from television service provider system 310 to media receiver 350 via network 160. Network 160 may be the Internet. While audio and video services may be provided to media receiver 350 via satellites 330, feedback from media receiver 350 to television service provider system 310 may be transmitted via network 160.

Figure 4:
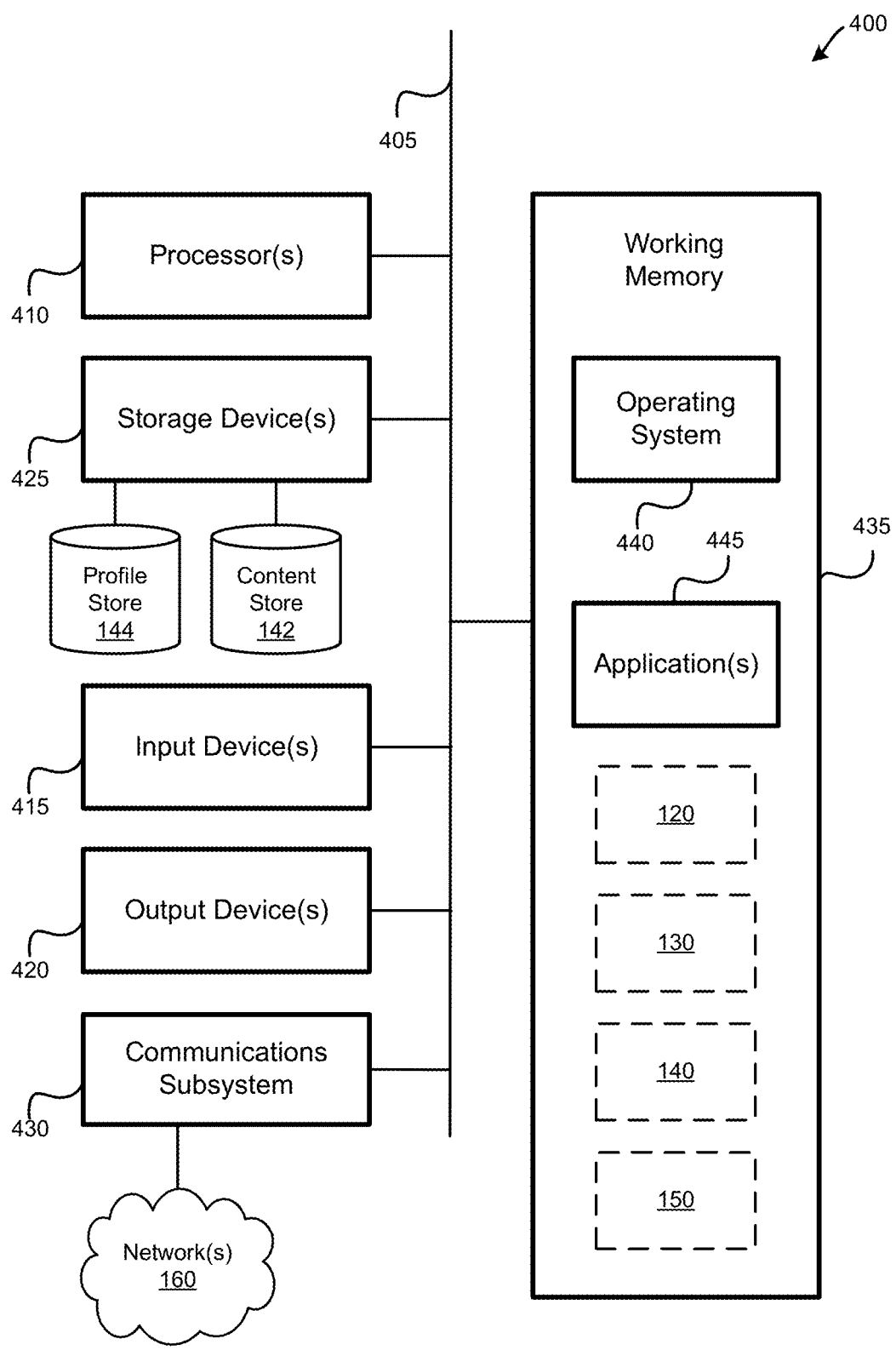
FIG. 4 provides a schematic illustration of one embodiment of a computer system that can perform various steps of the methods provided by various embodiments.

A computer system as illustrated in FIG. 4 may be incorporated as part of the previously described computerized devices, such as the content delivery appliance 110, or components of the content delivery appliance 110. FIG. 4 provides a schematic illustration of one embodiment of a computer system 400 that can perform various steps of the methods provided by various embodiments. It should be noted that FIG. 4 is meant only to provide a generalized illustration of various components, any or all of which may be utilized as appropriate. FIG. 4, therefore, broadly illustrates how individual system elements may be implemented in a relatively separated or relatively more integrated manner.

The computer system 400 is shown comprising hardware elements that can be electrically coupled via a bus 405 (or may otherwise be in communication, as appropriate). The hardware elements may include one or more processors 410, including, without limitation, one or more general-purpose processors and/or one or more special-purpose processors (such as digital signal processing chips, graphics acceleration processors, video decoders, and/or the like); one or more input devices 415, which can include, without limitation, a mouse, a keyboard, remote control, and/or the like; and one or more output devices 420, which can include, without limitation, a display device, a printer, and/or the like. In some embodiments, the input devices 415 include some or all of the sensor(s) 135. In other embodiments, some or all of the sensor(s) 135 are in communication with the computer system 400 via the sensor interface 130 (e.g., via the communications subsystem 430).

The computer system 400 may further include (and/or be in communication with) one or more non-transitory storage devices 425, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including, without limitation, various file systems, database structures, and/or the like. In some embodiments, the non-transitory storage devices 425 include the content store 142 and/or the profile store 144.

The computer system 400 might also include a communications subsystem 430, which can include, without limitation, a modem, a network card (wireless or wired), an infrared communication device, a wireless communication device, and/or a chipset (such as a Bluetooth™ device, an 402.11 device, a WiFi device, a WiMax device, cellular communication device, etc.), and/or the like. The communications subsystem 430 may permit data to be exchanged with a network (such as the one or more networks 160, to name one example), other computer systems, and/or any other devices described herein. In many embodiments, the computer system 400 will further comprise a working memory 435, which can include a RAM or ROM device, as described above.

The computer system 400 also can comprise software elements, shown as currently being located within the working memory 435, including an operating system 440, device drivers, executable libraries, and/or other code, such as one or more application programs 445, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or codes might be stored on a non-transitory computer-readable storage medium, such as the non-transitory storage device(s) 425 described above. In some cases, the storage medium might be incorporated within a computer system, such as computer system 400. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 400 and/or might take the form of source and/or installable code, which, upon compilation and/or installation on the computer system 400 (e.g., using any of a variety of generally available compilers, installation programs, compression/decompression utilities, etc.), then takes the form of executable code. In some embodiments, the executable code, when executed, implements the playback subsystem 120, the sensor interface 130, the automated responder subsystem 140, and/or the network interface 150.

In some embodiments, the computer system 400 implements a system for automated user-responsive video content delivery (e.g., as part of a media receiver 350) in communication with a display device 125. The system includes one or more of the processors 410, and a memory (e.g., working memory 435) communicatively coupled with, and readable by, the one or more processors 410 and having stored therein processor-readable instructions. When the instructions are executed by the one or more processors 410, they can cause the one or more processors 410 to: output video content to a user via the playback device 125, the video content temporally associated with content-of-interest (COI) identifiers, such that each COI identifier is defined as actively relevant during a respective playback time window of the video content, each COI identifier further associated with respective response data; detect receipt of dynamic input from the user at a detection time by monitoring a sensor system during the outputting; identify a set of presently active COI identifiers as those of the COI identifiers defined as actively relevant during respective playback time windows that intersect with the detection time; analyze the dynamic input according to the set of presently active COI identifiers automatically to generate a COI query corresponding to at least one of the set of presently active COI identifiers; generate a query response automatically responsive to the COI query based on the respective response data of the at least one of the set of presently active COI identifiers; and outputting the query response to the user via the playback device 125 as responsive to the detecting.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices, such as network input/output devices, may be employed.

As mentioned above, in one aspect, some embodiments may employ a computer system (such as the computer system 400) to perform methods in accordance with various embodiments of the invention. According to a set of embodiments, some or all of the procedures of such methods are performed by the computer system 400 in response to processor 410 executing one or more sequences of one or more instructions (which might be incorporated into the operating system 440 and/or other code, such as an application program 445) contained in the working memory 435. Such instructions may be read into the working memory 435 from another computer-readable medium, such as one or more of the non-transitory storage device(s) 425. Merely by way of example, execution of the sequences of instructions contained in the working memory 435 might cause the processor(s) 410 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 400, various computer-readable media might be involved in providing instructions/code to processor(s) 410 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 425. Volatile media include, without limitation, dynamic memory, such as the working memory 435.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code. Various forms of computer-readable media may be involved in carrying one or more sequences of one or more instructions to the processor(s) 410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 400.

The communications subsystem 430 (and/or components thereof) generally will receive signals, and the bus 405 then might carry the signals (and/or the data, instructions, etc., carried by the signals) to the working memory 435, from which the processor(s) 410 retrieves and executes the instructions. The instructions received by the working memory 435 may optionally be stored on a non-transitory storage device 425 either before or after execution by the processor(s) 410.

It should further be understood that the components of computer system 400 can be distributed across a network. For example, some processing may be performed in one location using a first processor while other processing may be performed by another processor remote from the first processor. Other components of computer system 400 may be similarly distributed. As such, computer system 400 may be interpreted as a distributed computing system that performs processing in multiple locations. In some instances, computer system 400 may be interpreted as a single computing device, such as a distinct laptop, desktop computer, or the like, depending on the context.

Figure 5:
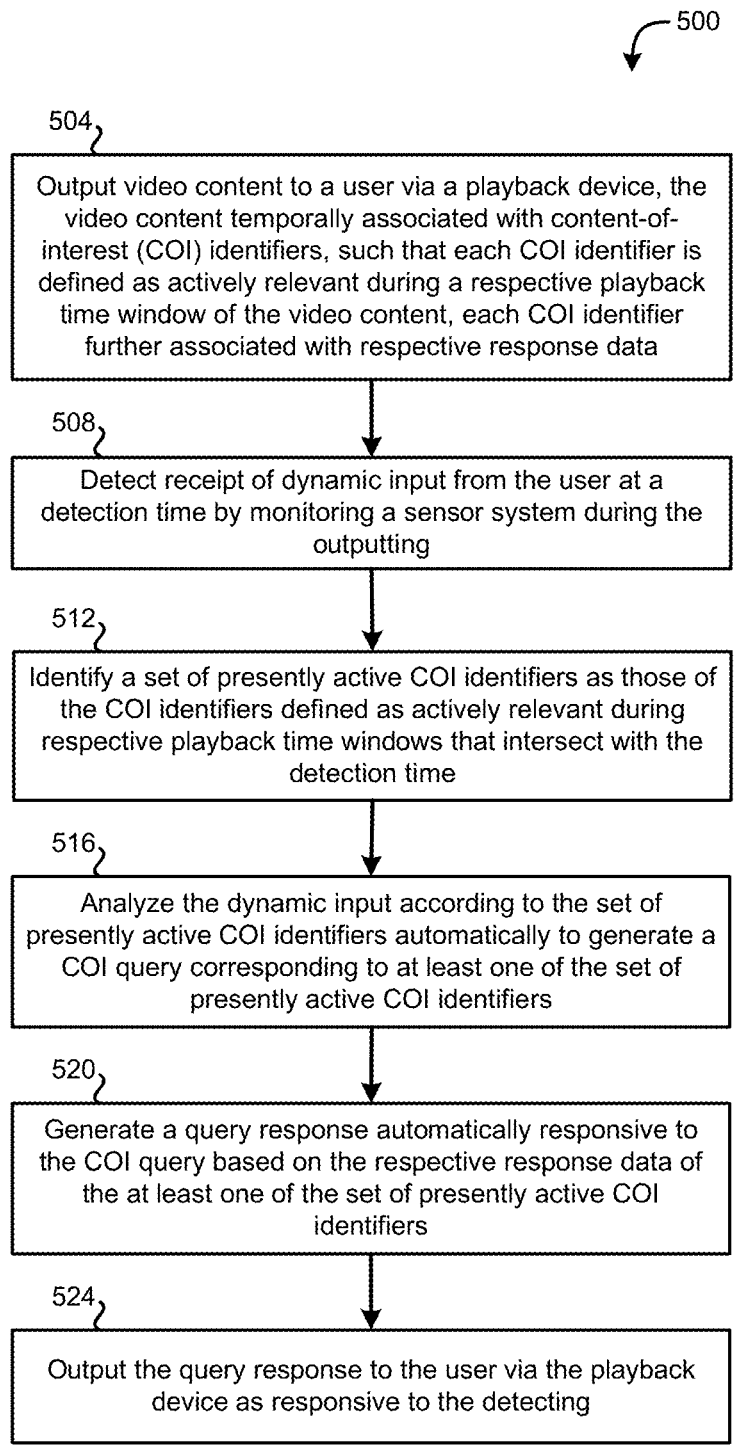
FIG. 5 shows a flow diagram of an illustrative method for automated user-responsive video content delivery, according to various embodiments.

Systems including those described above can be used to implement various methods. FIG. 5 shows a flow diagram of an illustrative method 500 for automated user-responsive video content delivery, according to various embodiments. Embodiments of the method 500 begin at stage 504 by outputting video content to a user via a playback device. The video content is temporally associated with COI identifiers, such that each COI identifier is defined as actively relevant during a respective playback time window of the video content. Each COI identifier is further associated with respective response data. At stage 508, embodiments can detect receipt of dynamic input from the user at a detection time by monitoring a sensor system during the outputting. For example, the detecting at stage 508 can include detecting receipt of dynamic audio information as the dynamic input from the user by monitoring an audio input sensor (e.g., a microphone) of the sensor system, and/or detecting receipt of dynamic video information as the dynamic input from the user by monitoring a video input sensor (e.g., a video camera) of the sensor system.

At stage 512, embodiments can identify a set of presently active COI identifiers as those of the COI identifiers defined as actively relevant during respective playback time windows that intersect with the detection time. In some embodiments, the identifying at stage 512 is in response to the detecting at stage 508. For example, the set of presently active COI identifiers is generated in response to detecting the dynamic sensor input. In other embodiments, the identifying at stage 512 includes dynamically updating the set of presently active COI identifiers during the outputting by dynamically identifying those of the COI identifiers as actively relevant during respective playback time windows that intersect with a running playback time of the video content. For example, embodiments maintain a dynamically updated set of presently active COI identifiers. In some such embodiments, the detecting at stage 508 includes monitoring the sensor system during the outputting at stage 504 to detect the receipt of the dynamic input from the user as invoking of at least one of the set of presently active COI identifiers that has been dynamically updated as of the present playback location corresponding to the detection time.

At stage 516, embodiments can analyze the dynamic input according to the set of presently active COI identifiers automatically to generate a COI query corresponding to at least one of the set of presently active COI identifiers. The dynamic input can be analyzed in any suitable manner, such as according to natural language processing, machine learning, and/or a predefined command structure. In some embodiments, the analyzing at stage 516 includes: generating a set of candidate COI keywords corresponding to the set of presently active COI identifiers; parsing the dynamic input to identify at least one user trigger word relating to at least one of the set of candidate COI keywords; and generating the COI query based on the at least one user trigger word, the at least one user trigger word corresponding to the at least one of the set of presently active COI identifiers.

At stage 520, embodiments can generate a query response automatically responsive to the COI query based on the respective response data of the at least one of the set of presently active COI identifiers. At stage 524, embodiments can output the query response to the user via the playback device as responsive to the detecting. Some embodiments can further output, coincident with outputting the video content at stage 524, a visual indication of at least a portion of the set of presently active COI identifiers (e.g., categorically) according to the present playback location. In some embodiments, the method 500 includes additional features and/or determinations. For example, some embodiments analyze the dynamic input according to the set of presently active COI identifiers to determine whether a valid COI query is generable. In such embodiments, the analyzing at stage 516, the generating at stage 520, and/or the outputting at stage 524 are performed only responsive to determining that a valid COI query is generable. In some such embodiments, the method 500 can further output, responsive to determining that a valid COI query is not generable, an unsuccessful query indication to the user via the playback device.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for automated user-responsive video content delivery, the method comprising:
   outputting video content to a user via a playback device, the video content temporally associated with content-of-interest (COI) identifiers, such that each COI identifier is defined as actively relevant during a respective playback time window of the video content, each COI identifier corresponding to respective sub-content that is displayed as part of the video content for a respective display duration, each COI associated with a respective stickiness, with a relevance window that includes the respective display duration and extends beyond the respective display duration by an amount of time based on the respective stickiness, and with respective response data;
   detecting receipt of dynamic input from the user at a detection time by monitoring a sensor system during the outputting, the detected dynamic input comprising dynamic audio information detected by monitoring interaction by the user with an audio input sensor of the sensor system;
   identifying a set of presently active COI identifiers as those of the COI identifiers having respective relevance windows that intersect with the detection time;
   analyzing the dynamic input according to the set of presently active COI identifiers automatically to generate a COI query corresponding to at least one of the set of presently active COI identifiers based on determining that the dynamic audio information corresponds to interest by the user in content associated with the at least one of the set of presently active COI identifiers;
   generating a query response automatically responsive to the COI query based on the respective response data of the at least one of the set of presently active COI identifiers; and
   outputting the query response to the user via the playback device as responsive to the detecting.

2. The method of claim 1, wherein the analyzing comprises:
   generating a set of candidate COI keywords corresponding to the set of presently active COI identifiers;
   parsing the dynamic input to identify at least one user trigger word relating to at least one of the set of candidate COI keywords; and
   generating the COI query based on the at least one user trigger word, the at least one user trigger word corresponding to the at least one of the set of presently active COI identifiers.

3. The method of claim 1, wherein the identifying is in response to the detecting.

4. The method of claim 1, wherein the identifying comprises dynamically updating the set of presently active COI identifiers during the outputting by dynamically identifying those of the COI identifiers as actively relevant during respective playback time windows that intersect with a running playback time of the video content.

5. The method of claim 4, wherein the detecting comprises monitoring the sensor system during the outputting to detect the receipt of the dynamic input from the user as invoking of at least one of the set of presently active COI identifiers dynamically updated at the running playback time corresponding to the detection time.

6. The method of claim 4, wherein the outputting further comprises outputting, coincident with the video content, a visual indication of at least a portion of the set of presently active COI identifiers according to the running playback time.

7. The method of claim 1, wherein the video content comprises the COI identifiers embedded therein.

8. The method of claim 1, wherein:
   the respective response data of the at least one of the set of presently active COI identifiers indicates a set of COI context hooks; and
   the query response is generated further according to a set of user-contextual data identified based on the set of COI context hooks.

9. The method of claim 1, wherein the dynamic input is analyzed according to natural language processing, machine learning, and/or a predefined command structure.

10. The method of claim 1, further comprising:
    analyzing the dynamic input according to the set of presently active COI identifiers to determine whether a valid COI query is generable,
    wherein the analyzing the dynamic input to generate the COI query, the generating the query response, and the outputting the query response are performed only responsive to determining that a valid COI query is generable.

11. The method of claim 10, further comprising:
    outputting, responsive to determining that a valid COI query is not generable, an unsuccessful query indication to the user via the playback device.

12. A content delivery appliance comprising:
    a network interface configured to receive video content from a content network, the video content temporally associated with content-of-interest (COI) identifiers, such that each COI identifier is defined as actively relevant during a respective playback time window of the video content, each COI identifier corresponding to respective sub-content that is displayed as part of the video content for a respective display duration, each COI associated with a respective stickiness, with a relevance window that includes the respective display duration and extends beyond the respective display duration by an amount of time based on the respective stickiness, and with respective response data;
    a playback subsystem including a playback interface configured to couple with a playback device, the playback subsystem to output the video content to a user via the playback device;
    a sensor interface configured to couple with one or more sensors and to monitor the one or more sensors during outputting of the video content by the playback subsystem;
    an automated responder subsystem coupled with the sensor interface to detect receipt of dynamic input from the user via the one or more sensors at a detection time, the detected dynamic input comprising dynamic audio information detected by monitoring interaction by the user with an audio input sensor of the sensor system, the automated responder subsystem configured to:
       identify a set of presently active COI identifiers as those of the COI identifiers having respective relevance windows that intersect with the detection time;

analyze the dynamic input according to the set of presently active COI identifiers automatically to generate a COI query corresponding to at least one of the set of presently active COI identifiers based on determining that the dynamic audio information corresponds to interest by the user in content associated with the at least one of the set of presently active COI identifiers;

generate a query response automatically responsive to the COI query based on the respective response data of the at least one of the set of presently active COI identifiers; and direct the playback subsystem to output the query response to the user via the playback device as a response to the detecting.

13. The content delivery appliance of claim 12, further comprising: a data store to store the COI identifiers in association with the video content, wherein the automated responder subsystem is to identify the set of presently active COI identifiers by querying the data store.

14. The content delivery appliance of claim 12, wherein the automated responder subsystem is to analyze the dynamic input by:

generating a set of candidate COI keywords corresponding to the set of presently active COI identifiers;

parsing the dynamic input to identify at least one user trigger word relating to at least one of the set of candidate COI keywords; and generating the COI query based on the at least one user trigger word, the at least one user trigger word corresponding to the at least one of the set of presently active COI identifiers.

15. The content delivery appliance of claim 12, wherein the automated responder subsystem is to identify the set of presently active COI identifiers by dynamically updating the set of presently active COI identifiers during outputting by the playback subsystem by dynamically identifying those of the COI identifiers as actively relevant during respective playback time windows that intersect with a running playback time of the video content.

16. The content delivery appliance of claim 15, wherein the automated responder subsystem is to detect receipt of the dynamic input by monitoring the one or more sensors during outputting by the playback subsystem to detect the dynamic input from the user as invoking of at least one of the set of presently active COI identifiers dynamically updated at the running playback time corresponding to the detection time.

17. A system for automated user-responsive video content delivery, the system comprising:

a set of processors;

a processor-readable medium having instructions stored thereon, which, when executed, cause the set of processors to perform steps comprising:

outputting video content to a user via a playback device, the video content temporally associated with content-of-interest (COI) identifiers, such that each COI identifier is defined as actively relevant during a respective playback time window of the video content, each COI identifier corresponding to respective sub-content that is displayed as part of the video content for a respective display duration, each COI associated with a respective stickiness, with a relevance window that includes the respective display duration and extends beyond the respective display duration by an amount of time based on the respective stickiness, and with respective response data;

detecting receipt of dynamic input from the user at a detection time by monitoring a sensor system during the outputting, the detected dynamic input comprising dynamic audio information detected by monitoring interaction by the user with an audio input sensor of the sensor system;

identifying a set of presently active COI identifiers as those of the COI identifiers having respective relevance windows that intersect with the detection time;

analyzing the dynamic input according to the set of presently active COI identifiers automatically to generate a COI query corresponding to at least one of the set of presently active COI identifiers based on determining that the dynamic audio information corresponds to interest by the user in content associated with the at least one of the set of presently active COI identifiers;

generating a query response automatically responsive to the COI query based on the respective response data of the at least one of the set of presently active COI identifiers; and outputting the query response to the user via the playback device as responsive to the detecting.

18. The system of claim 17, wherein the instructions, when executed, cause the set of processors to perform the analyzing by:

generating a set of candidate COI keywords corresponding to the set of presently active COI identifiers;

parsing the dynamic input to identify at least one user trigger word relating to at least one of the set of candidate COI keywords; and generating the COI query based on the at least one user trigger word, the at least one user trigger word corresponding to the at least one of the set of presently active COI identifiers.

19. The system of claim 17, wherein the instructions, when executed, cause the set of processors to perform the identifying by dynamically updating the set of presently active COI identifiers during the outputting by dynamically identifying those of the COI identifiers as actively relevant during respective playback time windows that intersect with a running playback time of the video content.

* * * * *